United States Patent

Roget et al.

[15] 3,642,452
[45] Feb. 15, 1972

[54] MULTISTAGE REACTORS

[72] Inventors: Jean Roget; Philippe Tarbouriech, both of Lyon, France

[73] Assignee: Rhone-Poulenc S.A., Paris, France

[22] Filed: Nov. 26, 1969

[21] Appl. No.: 880,238

[30] Foreign Application Priority Data

Nov. 26, 1968 France..........................175376

[52] U.S. Cl..................23/283, 23/252, 23/284, 23/285, 165/108, 261/114, 261/123
[51] Int. Cl..........................B01j 1/00, B01j 1/14
[58] Field of Search..............23/283, 285, 252, 284, 288, 23/288 E, 288 K, 288 L, 288 M; 165/108; 196/110, 126; 261/114, 123, 126

[56] References Cited

UNITED STATES PATENTS 2,550,722  5/1951  Rollman.........................165/108 X
3,186,802  6/1965  Gerrard.........................23/285 X
3,511,615  5/1970  Roget et al....................23/283

*Primary Examiner*—Joseph Scovronek
*Attorney*—Cushman, Darby and Cushman

[57] ABSTRACT

A multistage reactor including a vertical column divided into stages by horizontal separation plates. Each stage includes a bundle of vertical tubes, supported by upper and lower horizontal support plates, the tubes serving for the ascent and descent of liquid within such stage. The ascent tubes extend above the upper support plates by between 0.5 and 10 times their diameter. Through pipes in each separation plate, coaxial with the ascent tubes of the stage above, carry up-flowing gas or vapor and a down tube extends through each separation plate partially into the space above the upper support plate of the stage below.

6 Claims, 3 Drawing Figures

PATENTED FEB 15 1972 3,642,452

Inventors
Jean Roget
Philippe Tarbouriech
By Cushman, Darby & Cushman
Attorney

MULTISTAGE REACTORS

The present invention relates to a multistage reactor suitable for carrying out reactions which take place continuously at relatively low speeds, and for which it is essential to achieve high degrees of conversion of the reagents.

Multistage reactors consist of a series of stages in each of which one attempts to maintain the concentrations of the various constituents the same at all points within the stage, so that the product leaving each stage has the same composition as the product within such stage.

One known construction of a multistage reactor, for continuously carrying out, either concurrently or in countercurrent, reactions between gases and liquids or between liquids but in the presence of a gaseous or vapor phase, comprises a vertical column divided into stages by horizontal separation plates each such stage including a bundle of tubes consisting of tubes of various diameters which serve for the ascent and descent of the liquid within such stage, through pipes being provided in each separation plate between two consecutive stages, for the passage of gas or vapor from the lower stage to the upper stage, these through pipes being coaxial with the liquid ascent tubes of the bundle of tubes of the upper stage, and a down tube for the passage of liquid from one stage to the next, this down tube extending downwardly partially into the space above the bundle of tubes of the stage immediately below the plate in question.

This type of reactor permits excellent exchanges of material and heat between the liquid and gas phases. However, under certain conditions, there may be observed above the tube cluster a partial entrainment of gas or vapor bubbles. The circulation of the liquid is thus slowed down and the efficiency of the exchanges is reduced.

According to the present invention, there is provided such a reactor comprising a vertical column divided into stages by horizontal separation plates each such stage including a bundle of tubes consisting of tubes which serve for the ascent and descent of the liquid within such stage, through pipes being provided in each separation plate between two consecutive stages, for the passage of gas or vapor from the lower stage to the upper stage, these through pipes being coaxial with the liquid ascent tubes of the bundle of tubes of the upper stage, upper and lower substantially horizontal support plates for each bundle, to support the tube of a bundle in the column and a down tube for the passage of liquid from one stage to the next, this down tube extending downwardly partially into the space above the upper support plate of the stage immediately below the plate in question, a portion of each ascent tube of at least one of said bundles extending above the upper support plate of said bundle by a height of between 0.5 and 10 times its internal diameter.

In order that the invention may more readily be understood, the following description is given, merely by way of example, reference being made to the accompanying drawings, in which.

Figure 1:
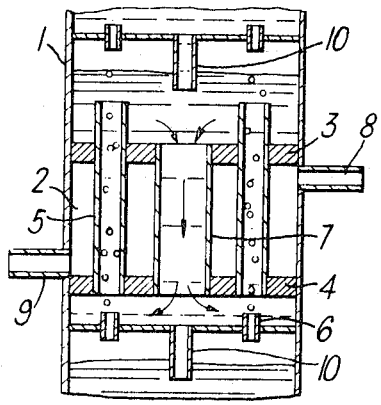
FIG. 1 is an axial section, of one stage of one embodiment of multistage reactor according to the invention.

FIG. 1 illustrates one stage of a reactor according to the invention. The reactor comprises a vertically extending cylindrical vessel 1 which is divided into a plurality of stages by a number of horizontally extending separating plates. Each stage, includes a bundle of tubes 2, such bundle being arranged slightly below the center of the stage, so that the space above the bundle is larger than the space below the bundle in such stage. The bundle of tubes comprises upper and lower supporting plates 3 and 4 between which extend a plurality of outer tubes 5 and a single central tube 7.

Each of the separating plates has, extending therethrough, immediately below each tube 5, a pipe 6. In the center of each separating plate, immediately below the central tube 7, is a downtube 10 passing into the upper portion of the stage below.

In order to heat or cool the reaction occurring in each stage, the heating or cooling liquid is introduced and expelled through tubes 8 and 9, into the space between the two plates 3 and 4, of each bundle, so that the heating or cooling fluid can flow in contact with the outside of the tubes 5 and 7.

Where a reactor consisting of stages, like that of FIG. 1, is used for reactions comprising a liquid phase and a gaseous or vapor phase, such as the reactions considered above, the operation of the reactor may be controlled in such a way that, in each stage, the liquid does not exceed a certain level between the upper separating plate and the lower orifice of the central down tube 10 into this plate, thus leaving a sufficient space in the upper part of the stage where the gas or vapor which has traversed the stage can collect. This gas or vapor passes from one stage to the stage immediately above by passing through the pipes 6, then emulsifies the liquid it encounters and causes it to rise in the ascent tubes 5 of the bundle 2 above, thus in each stage causing a circulation of liquid between the lower and upper spaces, whatever may otherwise be the direction of overall flow of the liquid through the reactor.

The new reactor of the invention thus consists of an assembly of stages analogous to that shown in FIG. 1, and additionally there are at the bottom and top the usual inlets and outlets for the reagents and the products resulting from the reaction.

The reactor of the invention may optionally also, like all multistage reactors, comprise complementary feed pipes (not shown) within the stages to make it possible to divide the feed along the length of the reactor according to the reaction conditions.

The tubes 5 extend between the plates 3 and 4 and rise to a height between 0.5 and 10 times and preferably between 1.5 and 6 times their internal diameter above the upper plate 3, the tubes 5 remaining immersed. The tubes 5 and 7 are assembled in fluidtight manner on the plates 3 and 4 by conventional methods, such as expanding, welding, etc.

Figure 2:
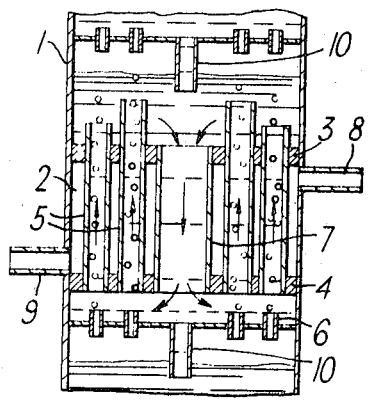
FIG. 2 is a view similar to FIG. 1 of a second embodiment of one stage of a reactor according to the invention.
Figure 3:
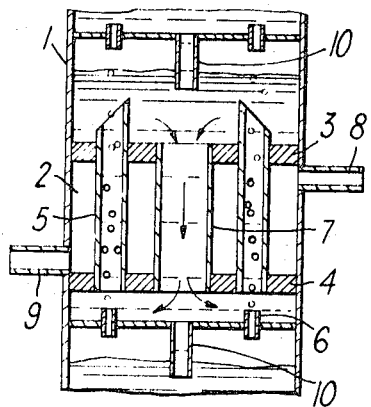
FIG. 3 is a view similar to FIG. 1 of a third embodiment of one stage of a reactor according to the invention.

The tubes 5 illustrated in FIG. 1 extend to an equal height above the plate 3, whereas the tubes 5 illustrated in FIG. 2 are disposed in concentric rings around the tube 7. The tubes of one ring extend to an equal height above the plate 3. The tubes 5 extend above the plate 3 to a height which is greater in proportion as they are disposed in rings of smaller diameter, i.e., as they are closer to the tube 7. The tubes 5 illustrated in FIG. 3 are bevelled or chamfered at their upper end which extends above the plate 3, the unsloped portion of the bevel being on the side closer to the tube 7.

These various embodiments are referred to by way of example and have no limiting character. A number of modified embodiments will be apparent to the person skilled in the art. More particularly, the tubes of the cluster of the reactor serving for the ascent of the liquid may be extended by end members of different diameter which are fixedly mounted either on the tubes of the cluster or on the plate 3.

The reactor according to the invention facilitates the separation of the liquid and gas phases and the descent of the liquid. It enables the liquid phase to circulate at higher speeds, whereby the heat exchanges and the material exchanges between phases are improved. This reactor is employed in the same way as the multistage reactors of known type.

The technical advance afforded by the present invention may be illustrated by the following comparative example:

EXAMPLE

The apparatus illustrated in FIG. 1 was employed, and included six tubes 5 having an internal diameter of 28 mm., disposed above and coaxially with nozzles of a diameter of 2 mm. These tubes were also distributed on a circle of a diameter of 108 mm. around a central tube having a height of 400 mm, and an internal diameter of 50 mm. The tubes 5 extended to a height of 100 mm. above the plate 3 and the stage was filled with water, the level of which in the state of rest was 160 mm. above the plate 3.

Air was introduced at a rate of flow of 2 cubic meters per hour (under normal temperature and pressure conditions), so that a water circulation was set up within the stage under consideration. The rate of waterflow, measured within the tube 7, was equal to 5.8 cubic meters per hour.

By way of comparison, all other conditions being equal, with the tubes 5 extending to a height of 50 mm. above the plate 3, the rate of flow of water was equal to 5.3 cubic meters per hour.

With the tubes 5 not extending above the plate 3, the rate of waterflow was reduced to 4.2 cubic meters per hour.

The efficiency of the heat exchanges and material exchanges between the liquid and gas phases being directly related to the speeds of circulation of the fluids within the apparatus, it will be seen that the apparatus comprising the improvement according to the invention has a distinctly improved efficiency as compared with the multistage reactor of known type.

We claim:

1. A multistage reactor for continuously carrying out, either cocurrently or in countercurrent, reactions between gases and liquids or between liquids but in the presence of a gaseous or vapor phase with the possible presence of a finely divided solid, said reactor comprising in combination:
   a. a vertical column,
   b. a plurality of horizontal separation plates dividing said column into a plurality of stages, each of said separation plates having therein a plurality of through-pipes extending therethrough and above each said separation plate and at least one down tube opening into each of said separation plates and extending downwardly therefrom,
   c. inlet and outlet means communicating with said vertical column and disposed, respectively, above and below the uppermost and lowermost stages as defined by said horizontal separation plates,
   d. a bundle of vertically disposed tubes in each of said stages, each of said bundles including ascent tubes and at least one descent tube for the ascent and descent of liquid therein, respectively,
   e. upper and lower substantially horizontal support plates for each said bundle, effective to support the tubes of the bundle in said column,
   f. each of said plurality of through-pipes being plated in its respective separation plate so as to be coaxial with one of said ascent tubes in the bundle of tubes in the stage immediately thereabove for directing flow from the stage immediately therebelow upwardly through the ascent tube immediately thereabove,
   g. a plurality of spaces, each said space being defined by one of said separation plates and the one of said upper support plates in the stage immediately therebelow, and each said down tube being placed in said separation plate associated therewith and having a length such that said down tube extends into said space immediately therebelow and is substantially coaxial with said descent tube in the bundle of tubes of said stage immediately therebelow, and
   h. a portion to each ascent tubes of at least one of said bundles extending above the upper support plate of said bundle by a height of between 0.5 and 10 times its internal diameter.

2. A reactor as claimed in claim 1, wherein each down tube is positioned centrally of the associated separation plate.

3. A reactor as claimed in claim 1, wherein the tubes of a bundle are arranged in a plurality of concentric rings, the said portions which extend above the upper support plate of the tubes of a ring being of the same height as each other.

4. A reactor as claimed in claim 3, wherein said portions of one ring extend to a different height from said portions of another ring.

5. A reactor as claimed in claim 1 and further comprising upper chamfered ends to said portions.

6. A reactor as claimed in claim 1, wherein each bundle of tubes has associated therewith means for the circulation of a heating or cooling fluid around the tubes of a bundle.

* * * * *